Nov. 8, 1932.　　　　J. SCHULMAN　　　　1,886,911
COMBINED COLLAPSIBLE LUGGAGE CARRIER AND BUMPER
Filed Feb. 24, 1932
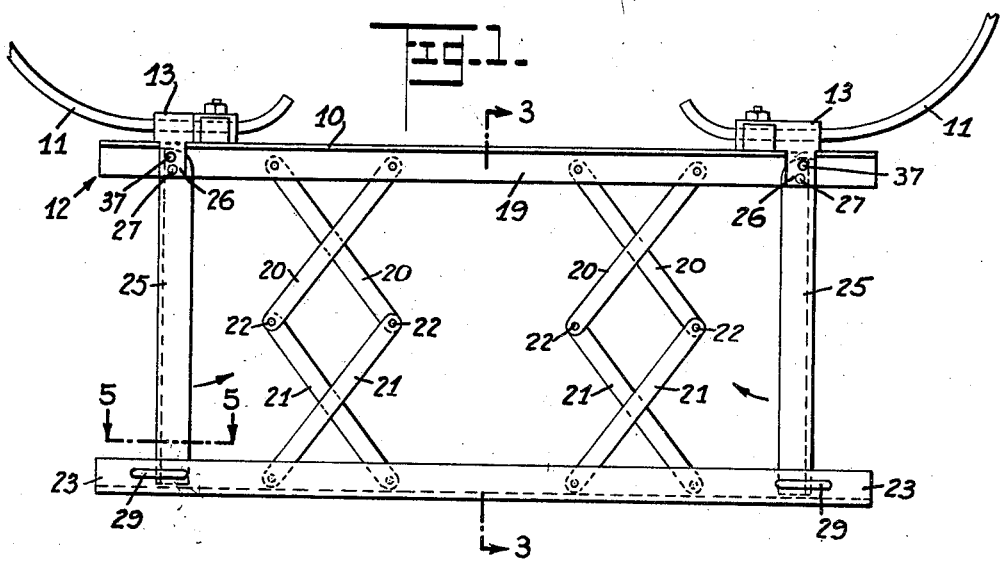
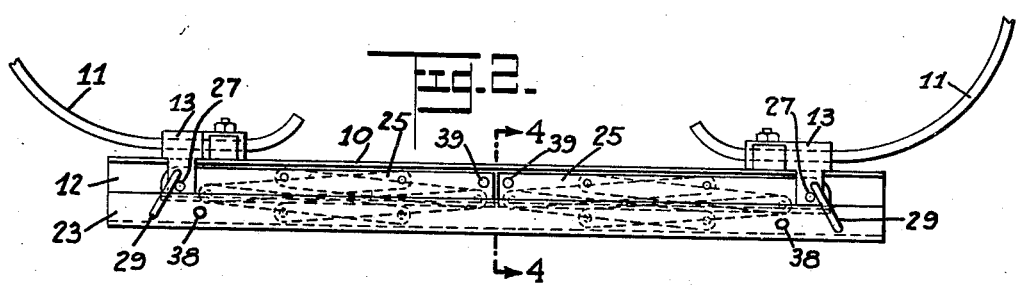
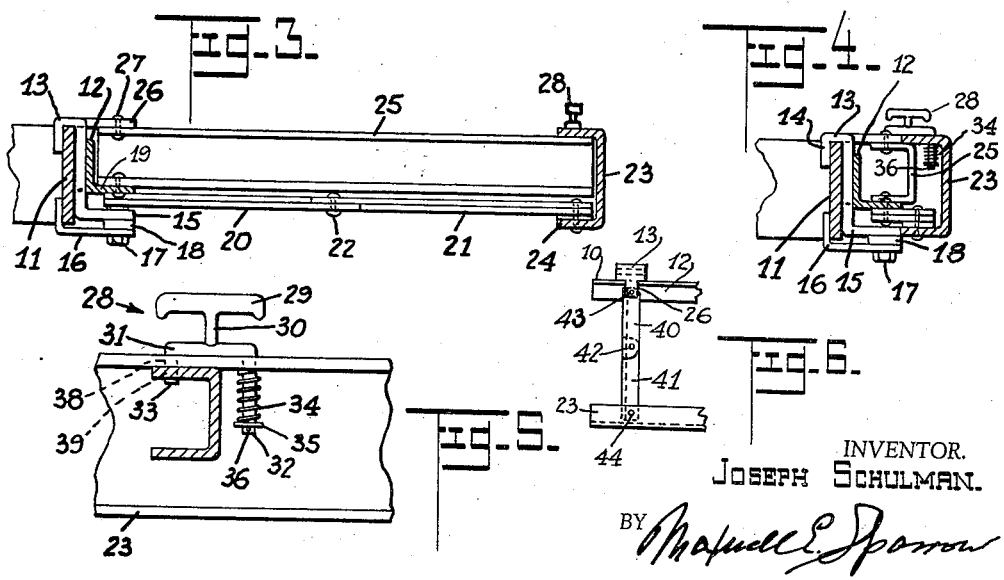
INVENTOR.
JOSEPH SCHULMAN.
BY
ATTORNEY.

Patented Nov. 8, 1932

1,886,911

UNITED STATES PATENT OFFICE

JOSEPH SCHULMAN, OF BROOKLYN, NEW YORK

COMBINED COLLAPSIBLE LUGGAGE CARRIER AND BUMPER

Application filed February 24, 1932. Serial No. 594,819.

This invention relates to combined luggage carrier and bumper as applied to the rear portion of a motor vehicle.

An object of this invention resides in the provision of a combined collapsible luggage carrier and bumper unit for motor vehicles.

A further object of this invention resides in the provision of a combined luggage carrier and bumper extension adapted to be readily attached to the present and existing bumperettes or rear bumper of motor vehicles.

A further object of this invention is to provide a combined extensible luggage carrier and bumper unit which when collapsed gives the unit the appearance of the usual rear bumper of a motor vehicle, the luggage carrier portion being then completely concealed from view.

A further object of this invention is to produce a combined collapsible luggage carrier and bumper unit which provides additional rear bumper protection for a motor vehicle, the said unit serving the function of an auxiliary bumper.

A further object of this invention is to produce a combined collapsible luggage carrier and bumper unit for a motor vehicle wherein the parts are so arranged that the luggage carrier, whether in operable or collapsed position is protected against injury which would otherwise result from any rear impact or collision.

A further object of the invention is to produce a combined collapsible luggage carrier and bumper unit for a motor vehicle wherein the parts are so arranged that the vehicle is spring protected against possible injury resulting from a rear impact or collision, irrespective of whether the luggage carrier is in extended or retracted position.

A further object of the invention is to provide in a combined extensible luggage carrier and bumper, for a motor vehicle, end bar-locks which aid in strengthening the structure and provide means which cooperate with the bumperettes or main bumper, to which the unit is attached, for transmitting any impact or shock which the latter may receive to the main bumper or bumperettes, when the unit is in extended position.

A further object of the invention is to produce a combined extensible luggage carrier and bumper unit for motor vehicles which is simple in construction, efficient in use, economical in cost, pleasing in appearance and which may be very conveniently and easily attached to the fixed bumperettes or bumper of the vehicle without changing, removing, altering or drilling etc. any part thereof.

A further object of the invention resides in the provision of a combined extensible luggage carrier and bumper unit for attachment to the usual fixed bumperettes or bumper of a motor vehicle, its structure being such that it readily conforms in appearance to the general lines of the fixed bumperettes or bumper.

A further object of the invention resides in the production of a combined extensible and contractable luggage carrier and bumper wherein the parts are so arranged as to form a closure for the reception of the luggage, thereby protecting the luggage against injury and facilitating its being held within the carrier.

A further object of the invention resides in providing in a combined collapsible luggage carrier and bumper, means to lock the unit either in extended or retracted position.

These and other objects of the invention and the means for their attainment will be more apparent from the following detailed description, taken in connection with the accompanying drawing, illustrating one embodiment by which the invention may be realized, and in which:

Fig. 1 is a plan view of the device in extended position.

Fig. 2 is a plan view of the device in closed or collapsed position.

Fig. 3 is a view of the same taken along line 3—3 of Figure 1, looking in the direction of the arrows.

Fig. 4 is a view of the same taken along line 4—4 of Figure 2, looking in the direction of the arrows.

Fig. 5 is an enlarged sectional detail view of the lock taken along line 5—5 of Figure 1, looking in the direction of the arrows.

Fig. 6 shows a modified form of bar lock used in the invention.

The drawing shows the device removably attached to the rear bumperettes of a motor vehicle, but it is understood that the same may be applied to the rear bumper bar or bars of a motor vehicle, being removably attached by the means shown in the drawing or in any other suitable manner.

In the drawing the numeral 11 represents the bumperettes usually attached to the rear of a motor vehicle (not shown).

The horizontal bar 12 is preferably an L-shaped angle bar disposed in such manner as to have its leg upwardly extending. The bar 12 is removably attached by means of the clamp members 13 to the resilient portions of the bumperettes 11, the members 13 being secured to bar 12 in any suitable manner. Each clamp member 13 has a U-shaped top portion 14 and an angled-shaped bottom portion 15, the portion 14 engaging the top of a bumperette 11. To complete securing of clamp member 13 to the bumperette 11 there is provided an angled-shaped clamp member 16 which is secured to the lower portion 15 of clamp member 13 by means of bolt 17. To allow for different sizes of bumperettes 11 there is inserted a spacer 18 between portions 15 of clamp member 13 and clamp member 16.

Pivotally mounted on the underside of horizontal leg 19 of angle 12 are collapsible connecting links 20 and pivotally mounted on the underside of horizontal leg 24 of bar 23, which is preferably a channel bar, are the collapsible connecting links 21, the links 20 and 21 being pivotally connected at 22.

To rigidly secure bar 23 when in extended position as shown in Figure 1, cross members 25 are provided, which are preferably of the channel or angle type, each of said members 25 being pivotally mounted at 27 to a horizontally extending lip 26, said lip being preferably formed out of clamp member 13, and to leg 19 of bar 12.

The free end of each cross member 25, when the device is open or extended and the cross members 25 in operable position, engage bar 23 by means of lock 28 as shown in Figure 5.

The lock 28 comprises a handle 29, stem 30 and U-shaped engaging portion 31 of which leg 32 is pivotally fixed in bar 23, the short end 33 of portion 31 being the actual locking part. Encircling the long end 32 of portion 31 is a compression spring 34 held in position by washer 35 and cotter 36. The handle 29, stem 30 and U-shaped portion 31 are essentially combined to form a single unit.

The locks 28 are used to secure rigidly the device in either extended or collapsed position. When the device is in closed or collapsed position, the short end 33 of lock 28 enters hole 37 in lip 26, and when the device is in open or extended position, short end 33 enters hole 38 of bar 23 and hole 39 of cross bar 25.

When the device is in operable position the longitudinal bars 12, 23 and transverse bars 25 provide a closure or pocket for the reception of a trunk or other luggage, the outermost bar 23 comprising a bumper, any shock received by it being transmitted to the bumperettes 11 through the transverse members 25.

When in operable position, the device projects or extends outwardly from the rear of the car in a horizontal plane as shown in Figure 1 and when contracted or collapsed, assumes the position shown in Figure 2.

It is to be noted that when in collapsed position, the device takes on the form of a substantially rectangular box-like structure wherein the connecting links or lazy tongs 20, 21, bar 12, cross members 25 are substantially hidden from view. This is shown clearly in Figures 2 and 4.

From the foregoing it can be seen that there is herein provided a combined extensible luggage carrier and bumper unit which is adapted to be readily attached to the present and existing bumperettes or rear bumpers of motor vehicles, which when collapsed gives the unit the appearance of the usual rear bumper, the luggage carrier element being substantially completely concealed from view, and when in contracted position provides additional rear bumper protection.

It can also be seen from the foregoing that the parts of the device are so arranged that the luggage carrier, whether in operable or collapsed position, and any luggage carried thereon when in operable position, is protected against possible injury due to any rear impact or collision, and the vehicle is spring protected against possible injury resulting from such impact or collision, irrespective of whether the luggage carrier is in extended or retracted position.

The end or cross members 25 aid in strengthening the structure and provide means which cooperate with the bumperettes or main bumper for transmitting any impact or shock which the bar 23 may receive to the main bumper or bumperettes, when the unit is in operable position.

The drawing shows one form of clamping means to clamp the device onto the bumperettes or bumper of the vehicle without changing, removing, altering or drilling any parts thereof, but it is understood that any similar or other practical means may be employed for the purpose. The locking mechanism shown in detail in Figure 5 is preferable, but it is understood that any other locking mechanism may be employed for the purpose intended. It is further understood that the connecting links 20, 21, may be arranged relative to the members 12 and 23, in any suitable manner other than that disclosed in the drawing.

Figure 6 shows a modified form of cross bars, each comprising the two links 40, 41 having their adjacent or adjoining ends pivoted at 42, the other ends of the links 40, 41, being pivoted respectively to the longitudinal bars 12 and 23, as shown at 43, 44 respectively. When the device is retracted, these links collapse in a manner similar to the links 20, 21.

In the accompanying drawing I have illustrated the invention embodied in one of its practical commercial forms but as this illustration is primarily for purposes of disclosure it will be understood that the invention is not limited to this particular form of structure and that it may be modified in many respects without departure from the true spirit and scope of the invention as herein defined and claimed. I wish it further understood that the terms which I have employed herein are used in a descriptive rather than in a limiting sense, except however for such limitations that may be imposed by the state of the prior art.

Having thus described my invention, what I claim as new and desire to secure by Letters Patent, is:—

1. A combined luggage carrier and rear bumper adapted to be attached to the usual rear bumper or bumperettes of a motor vehicle and comprising two substantially parallel, longitudinal members, lazy tongs connecting said members, by which one of said members may be extended with respect to the other, and foldable means for retaining the extendible member in extended position.

2. A combined luggage carrier and rear bumper adapted to be attached to the usual rear bumper or bumperettes of a motor vehicle and comprising two substantially parallel, longitudinal members, means connecting said members by which one thereof may be extended with respect to the other, means for retaining the former in extended position, and means for locking said extendible member to the retaining means when the said extendible member is in extended position.

3. A combined luggage carrier and rear bumper for motor vehicles comprising two substantially parallel, longitudinal members, extensible links connecting said members by which one of said members may be extended with respect to the other, and arms swingably connected to at least one of said members for retaining the extendible member in extended position.

4. A combined luggage carrier and rear bumper adapted to be attached to the usual rear bumper or bumperettes of a motor vehicle and comprising two substantially parallel, longitudinal members, pivotal connecting links connecting said members by which one thereof may be extended with respect to the other, and swingable arms for retaining said members in spaced relation.

5. A combined luggage carrier and rear bumper adapted to be attached to the usual rear bumper or bumperettes of a motor vehicle and comprising two substantially parallel, longitudinal members, pivotal connecting links connecting said members by which one thereof may be extended with respect to the other, swingable arms for holding said members in spaced relation, and means to lock said arms to one of the members when the extendible member is in extended position.

6. A combined luggage carrier and rear bumper adapted to be attached to the usual rear bumper or bumperettes of a motor vehicle and comprising two substantially parallel, longitudinal members, means connecting said members by which one thereof may be extended with respect to the other, means for holding the extendible member in extended position, and means for locking the holding means to the extendible member when the latter is in extended or retracted position.

Signed at New York, in the county and State of New York, this 6th day of Feb., 1932.

JOSEPH SCHULMAN.